(12) United States Patent
Mani

(10) Patent No.: US 9,895,754 B2
(45) Date of Patent: Feb. 20, 2018

(54) CUTTING TOOL WITH REPLACEABLE CUTTING INSERT AND INCLINED ATTACHMENT ELEMENTS

(71) Applicant: Kennametal India Limited, Bangalore (IN)

(72) Inventor: Arvind Mani, Bangalore (IN)

(73) Assignee: KENNAMETAL INDIA LIMITED, Bangalore (IN)

( * ) Notice: Subject to any disclaimer, the term of this patent is extended or adjusted under 35 U.S.C. 154(b) by 173 days.

(21) Appl. No.: 14/693,934

(22) Filed: Apr. 23, 2015

(65) Prior Publication Data
US 2015/0306686 A1 Oct. 29, 2015

(30) Foreign Application Priority Data
Apr. 24, 2014 (IN) .......................... 2083/CHE/2014

(51) Int. Cl.
| B23C 5/22 | (2006.01) |
|---|---|
| B23C 5/00 | (2006.01) |
| B23C 5/10 | (2006.01) |
| B23B 51/02 | (2006.01) |

(52) U.S. Cl.
CPC ............. *B23C 5/109* (2013.01); *B23B 51/02* (2013.01); *B23B 2205/04* (2013.01); *B23B 2251/02* (2013.01); *B23C 2210/02* (2013.01); *B23C 2210/165* (2013.01); *B23C 2210/168* (2013.01)

(58) Field of Classification Search
CPC .............. B23C 2210/168; B23C 5/109; B23C 2210/02; B23C 2210/165; B23B 2251/02; B23B 2205/04
See application file for complete search history.

(56) References Cited

U.S. PATENT DOCUMENTS

| 3,207,015 A | * | 9/1965 | Ditto | ................. B23B 29/03407 407/109 |
|---|---|---|---|---|
| 3,747,946 A | * | 7/1973 | Edens | ................. B23B 31/1074 279/81 |
| 3,827,119 A | * | 8/1974 | Bennett | .................... B23C 5/207 407/113 |
| 4,632,593 A | * | 12/1986 | Stashko | .............. B23B 27/1622 403/11 |
| 5,580,194 A | * | 12/1996 | Satran | ................... B23C 5/1036 407/114 |
| 5,649,794 A | * | 7/1997 | Kress | ....................... B23B 51/00 408/181 |
| 5,906,245 A | * | 5/1999 | Tibbitts | ............... E21B 10/5673 175/426 |

(Continued)

*Primary Examiner* — Sara Addisu
(74) *Attorney, Agent, or Firm* — Matthew S. Bedsole

(57) ABSTRACT

A cutting tool includes a generally cylindrical tool body disposed about a central longitudinal axis, the tool body having first and second extending sides with respective first and second bores that pass therethrough, wherein a first longitudinal axis of the first bore and a second longitudinal axis of the second bore are configured to be non-parallel to a horizontal axis of the tool body that is perpendicular to the central longitudinal axis of the tool body. The cutting tool also includes a replaceable cutting insert configured to be removably attached to the tool body and first and second attachment elements configured for receipt in the first and second bores, respectively, and adapted to engage the cutting insert and secure the cutting insert to the tool body.

20 Claims, 6 Drawing Sheets

(56) References Cited

U.S. PATENT DOCUMENTS

| | | | |
|---|---|---|---|
| 6,012,881 A * | 1/2000 | Scheer | B23B 31/008 408/145 |
| 6,196,769 B1 * | 3/2001 | Satran | B23B 51/00 407/40 |
| 6,299,180 B1 * | 10/2001 | Satran | B23B 31/1075 279/83 |
| 6,406,226 B2 * | 6/2002 | Kojima | B23B 51/048 408/223 |
| 6,481,938 B2 * | 11/2002 | Widin | B23B 51/02 408/226 |
| 6,506,003 B1 * | 1/2003 | Erickson | B23B 51/02 408/226 |
| 6,575,670 B2 * | 6/2003 | Men | B23C 5/1036 407/114 |
| 6,582,164 B1 * | 6/2003 | McCormick | B23B 31/113 408/144 |
| 6,848,869 B2 * | 2/2005 | Stokey | B23B 51/0009 408/224 |
| 6,899,495 B2 * | 5/2005 | Hansson | B23B 51/02 408/144 |
| 7,070,367 B2 * | 7/2006 | Krenzer | B23B 51/02 408/226 |
| 7,131,799 B2 * | 11/2006 | Stokey | B23B 51/0009 408/230 |
| 7,244,081 B2 * | 7/2007 | Johnson | B23B 31/1075 408/144 |
| 7,311,480 B2 * | 12/2007 | Heule | B23B 51/00 408/227 |
| 7,407,350 B2 * | 8/2008 | Hecht | B23B 51/02 407/34 |
| 7,547,166 B2 * | 6/2009 | Nuzzi | B23B 51/0009 408/227 |
| 7,556,458 B2 * | 7/2009 | Heilmann | B23B 29/03 407/11 |
| 7,591,617 B2 * | 9/2009 | Borschert | B23B 51/02 408/226 |
| 7,997,836 B2 * | 8/2011 | Kim | B23B 51/0009 407/40 |
| 8,021,088 B2 * | 9/2011 | Hecht | B23B 51/02 408/1 R |
| 8,449,227 B2 * | 5/2013 | Danielsson | B23B 51/02 408/226 |
| 8,678,722 B2 * | 3/2014 | Aare | B23B 51/02 408/226 |
| 8,721,235 B2 * | 5/2014 | Kretzschmann | B23B 51/02 408/144 |
| 8,882,413 B2 * | 11/2014 | Hecht | B23B 51/02 408/226 |
| 9,028,180 B2 * | 5/2015 | Hecht | B23B 51/02 408/230 |
| 9,498,829 B2 * | 11/2016 | Zabrosky | B23B 51/0493 |
| 2001/0026738 A1 * | 10/2001 | Kojima | B23B 51/02 408/227 |
| 2002/0015623 A1 * | 2/2002 | Eriksson | B23B 51/02 407/53 |
| 2002/0168239 A1 * | 11/2002 | Mast | B23B 51/02 408/144 |
| 2004/0223819 A1 * | 11/2004 | Sheffler | B23C 5/2221 407/108 |
| 2005/0098359 A1 * | 5/2005 | Lee | B23B 51/02 175/432 |
| 2009/0116920 A1 * | 5/2009 | Bae | B23B 51/02 408/227 |
| 2010/0303561 A1 * | 12/2010 | Fouquer | B23B 27/1622 407/102 |
| 2011/0110739 A1 * | 5/2011 | Frisendahl | B23B 31/1076 408/200 |
| 2011/0236145 A1 * | 9/2011 | Pabel | B23B 51/02 408/226 |
| 2012/0014760 A1 * | 1/2012 | Glimpel | B23B 51/02 408/230 |
| 2012/0148358 A1 * | 6/2012 | Hecht | B23B 51/02 408/200 |
| 2012/0230787 A1 * | 9/2012 | Harif | B23B 51/02 408/200 |
| 2014/0301799 A1 * | 10/2014 | Schwaegerl | B23B 51/02 408/231 |
| 2015/0147128 A1 * | 5/2015 | Saji | B23B 51/00 408/199 |
| 2015/0151364 A1 * | 6/2015 | Choi | B23B 27/1662 407/104 |
| 2015/0360300 A1 * | 12/2015 | Hecht | B23B 51/00 408/231 |
| 2016/0263663 A1 * | 9/2016 | Schwaegerl | B23B 51/02 |
| 2016/0263664 A1 * | 9/2016 | Son | B23B 51/02 |
| 2016/0311035 A1 * | 10/2016 | Peng | B23B 51/02 |
| 2016/0375499 A1 * | 12/2016 | Jager | B23B 51/02 408/199 |

* cited by examiner

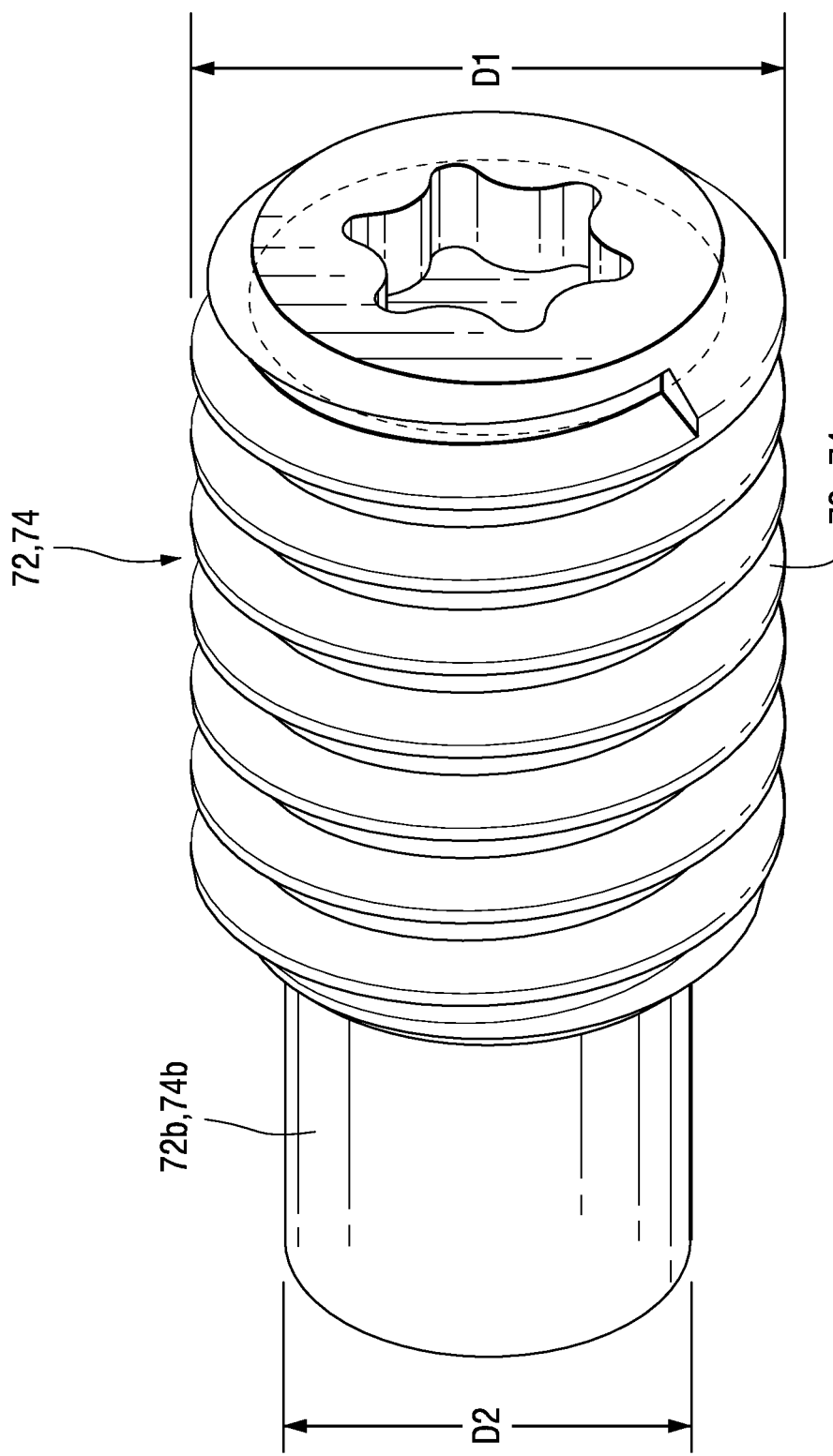

US 9,895,754 B2

CUTTING TOOL WITH REPLACEABLE CUTTING INSERT AND INCLINED ATTACHMENT ELEMENTS

BACKGROUND OF THE INVENTION

The present invention relates to cutting tools for performing machining operations on a workpiece and, more particularly, to cutting tools having replaceable cutting inserts. The invention further relates to replaceable cutting inserts for use with such tools and how the replaceable cutting inserts are secured to the cutting tool.

Conventional cutting tools can be of both one-part and multi-part design. Cutting tools of the type that make use of a holder part or tool body, as well as a separate, replaceable cutting part or insert, are especially common and may be of widely varying shapes and consist of, for instance, drilling tools, milling tools, thread cutters, etc. The tool body usually consists of a long narrow shank of a cylindrical basic shape having a first end adapted to be coupled in the chucking mechanism of a machine tool and a second end adapted to securely house the insert.

In most machine tools, the tool bodies are typically sophisticated and expensive, and thus are designed to be used with replaceable cutting inserts, which constitutes the wearing part of the tools. In other words, it is profitable to manufacture the actual cutting part as a separate, detachable unit, which may be replaced after being worn-out, while the holder part may be used for a longer period of time.

In practice, the replaceable cutting insert is entirely or partly manufactured from a hard, wear-resistant material, such as cemented carbide or the like, while the tool body is made of a material having a greater elasticity, e.g. steel.

There is a need for improved cutting tools with replaceable cutting inserts that overcome limitations, shortcomings and disadvantages of known cutting tools with replaceable cutting inserts.

SUMMARY OF THE INVENTION

In accordance with an aspect of the invention, a cutting tool includes a generally cylindrical tool body disposed about a central longitudinal axis, the tool body having a first end portion adapted to be coupled to a machine tool and an opposite second end portion having first and second extending sides disposed opposite one another and defining a slot therebetween. The first and second extending sides have respective first and second bores that pass therethrough, wherein a first longitudinal axis of the first bore and a second longitudinal axis of the second bore are configured to be non-parallel to a horizontal axis of the tool body that is perpendicular to the central longitudinal axis of the tool body. The cutting tool also includes a replaceable cutting insert having a cutting portion structured to perform cutting operations on a workpiece, the cutting insert configured to be removably attached to the second end portion of the tool body. The cutting tool further includes first and second attachment elements configured for receipt in the first and second bores, respectively, and adapted to engage the cutting insert and secure the cutting insert to the tool body.

In accordance with another aspect of the invention, a cutting tool includes a generally cylindrical tool body disposed about a central longitudinal axis, the tool body having a first end portion adapted to be coupled to a machine tool and an opposite second end portion having first and second extending sides disposed opposite one another and defining a slot therebetween, the first and second extending sides having each having an outer side, an inner side and respective first and second bores that pass from the outer sides to the inner sides, the outer sides being parallel to the central longitudinal axis, wherein a first longitudinal axis of the first bore and a second longitudinal axis of the second bore are both inclined from the outer sides to the inner sides. The cutting tool also includes a replaceable cutting insert having a cutting portion structured to perform cutting operations on a workpiece, the cutting insert configured to be removably attached to the second end portion of the tool body. The cutting tool further includes first and second attachment elements configured for receipt in the first and second bores, respectively, and adapted to engage the cutting insert and secure the cutting insert to the tool body.

These and other aspects of the present invention will be more fully understood following a review of this specification and drawings.

BRIEF DESCRIPTION OF THE DRAWINGS

FIG. 6 is an enlarged view of the attachment element, in accordance with an aspect of the invention.

DETAILED DESCRIPTION

Referring now to the Figures, there is illustrated an example embodiment of a cutting tool 10 in accordance with aspects of the present invention. In the exemplary embodiment shown, cutting tool 10 comprises a drill used for forming cylindrical holes in a workpiece (not shown) when either cutting tool 10 or the workpiece is rotated about an axis. However, it is to be appreciated that the concepts disclosed herein may also be applied to other cutting tools without varying from the scope of the present invention.

Figure 1:
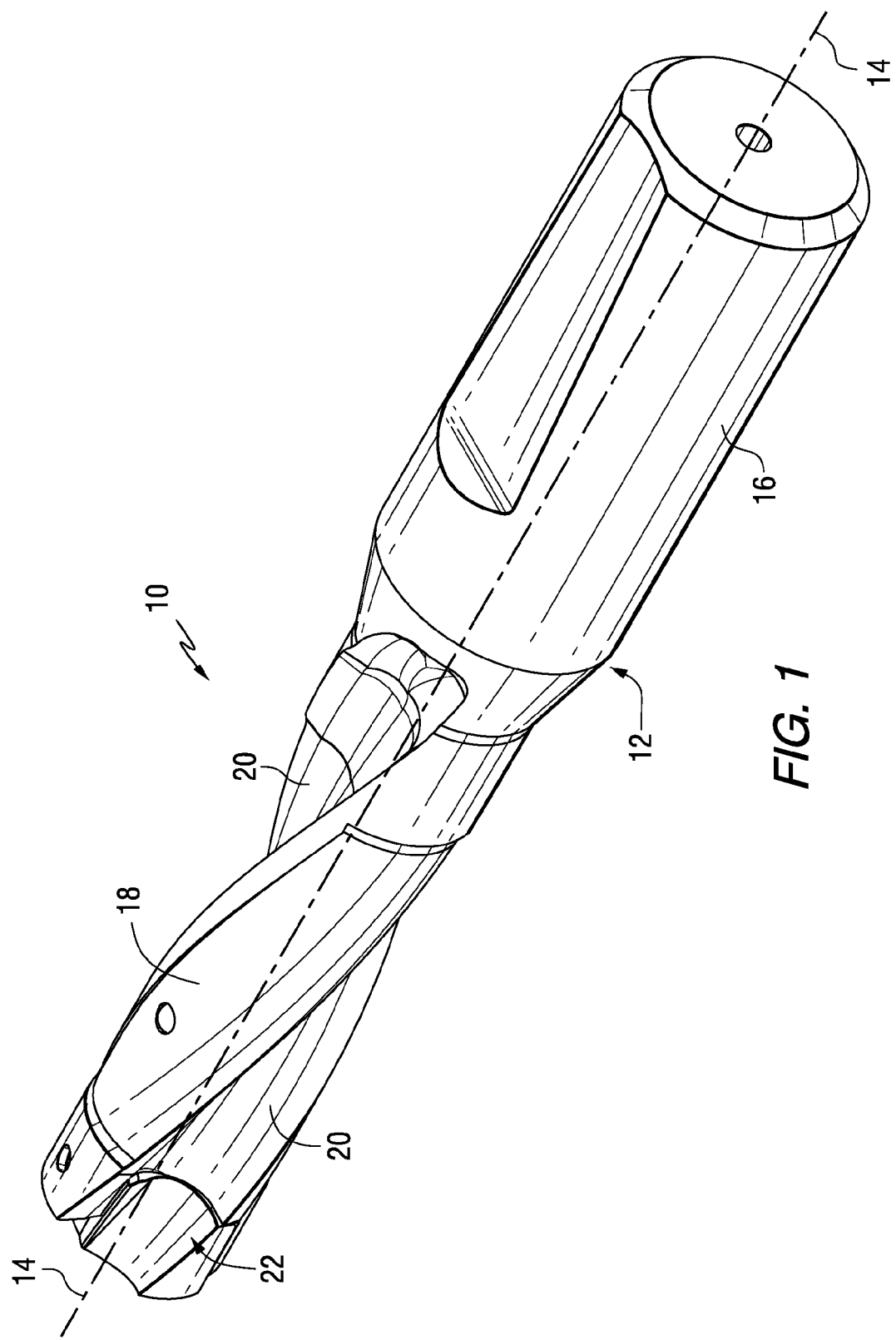
FIG. 1 is an isometric view of a cutting tool, in accordance with an aspect of the invention.

Referring to FIG. 1, cutting tool 10 includes a generally cylindrical tool body 12 disposed about a central longitudinal axis 14. The tool body 12 also includes a horizontal axis 15 that is generally perpendicular to the central longitudinal axis 14. Tool body 12 includes a first end portion 16 adapted to be coupled to a machine tool (not shown) and an opposite second end portion 18. Tool body 12 may include a number of flutes 20 formed therein extending generally from second end portion 18 toward first end portion 16. Cutting tool 10 further includes a removable/replaceable cutting insert 22 coupled to the second end portion 18 of tool body 12.

Figure 2:
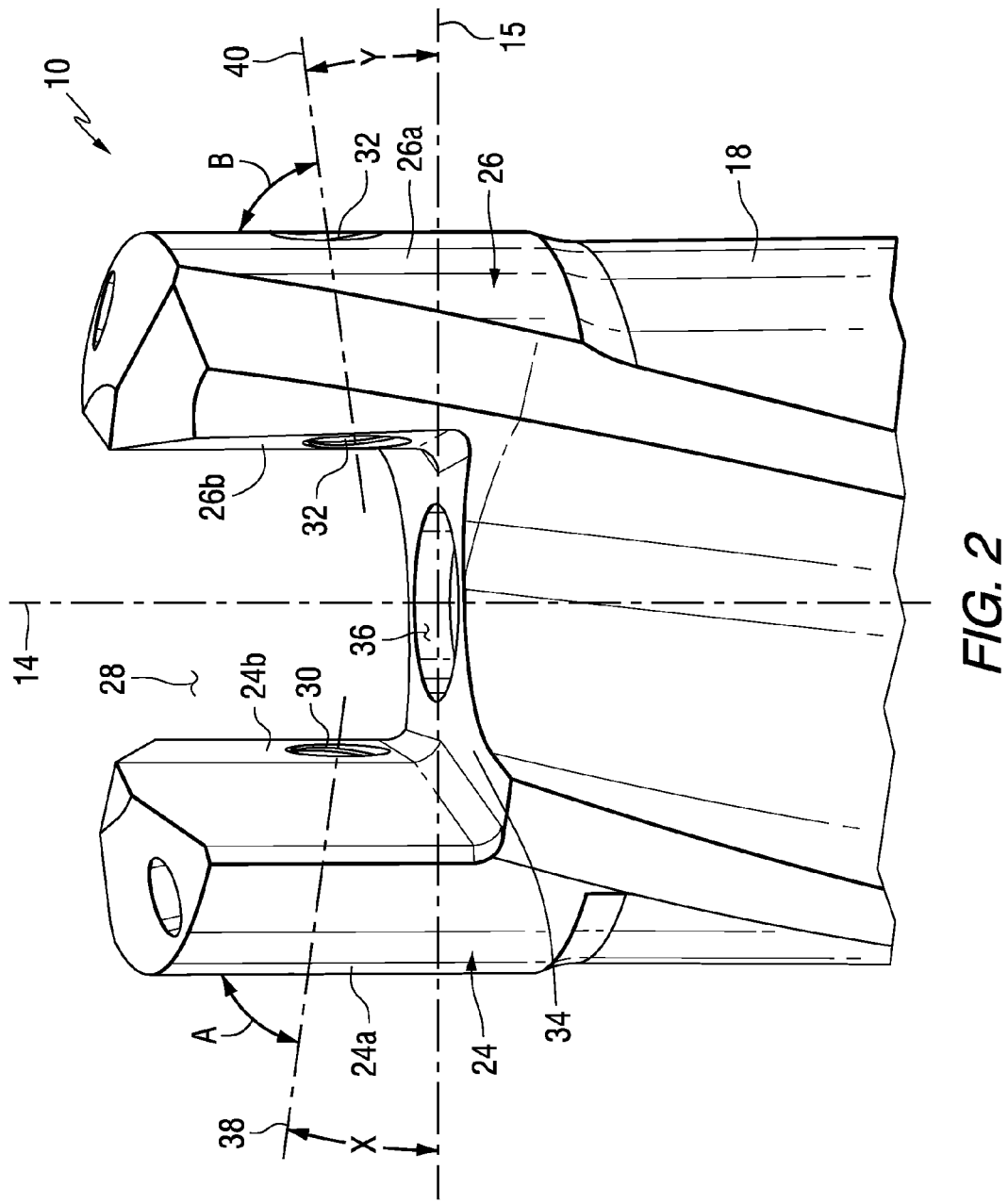
FIG. 2 is a partial isometric view of an end of the cutting, in accordance with an aspect of the invention.

Referring to FIG. 2, the second end portion 18 of the tool body 12 includes a first extending side 24 and a second extending side 26 disposed generally opposite one another and defining a slot 28 therebetween. The first and second extending sides 24, 26 each include an outer side 24a, 26a, an inner side 24b, 26b and respective first and second bores 30, 32 that pass through the first and second extending sides 24, 26. In one aspect, the first and second bores 30, 32 pass from the outer sides 24a, 26a to the inner sides 24b, 26b. The second end portion 18 also includes a mounting surface 34 extending between the first and second extending sides 24, 26. In one aspect, the mounting surface 34 includes a mounting hole 36. In another aspect, the mounting surface 34 is contained in a plane that contains the horizontal axis 15.

Referring to FIG. 2, the first bore 30 is configured such that a first longitudinal axis 38 thereof is inclined, angled or slopes from the outer side 24a to the inner side 24b. Thus, the first bore 30 and the first longitudinal axis 38 slope toward the bottom surface 34 of the second end portion 18. In one aspect, the first longitudinal axis 38 is configured to be non-parallel to the horizontal axis 15. In another aspect, the first longitudinal axis 38 is configured to be contained in a plane that is non-parallel to a plane that contains the horizontal axis 15. In another aspect, the first longitudinal axis 38 is inclined at an angle X in the range of about 5 degrees to about 10 degrees relative to the horizontal axis 15 of the tool body 12. In one example, angle X is 7 degrees. In another aspect, the plane that contains the first longitudinal axis 38 is inclined at the angle X in the range of about 5 degrees to about 10 degrees relative to the plane that contains the horizontal axis 15 of the tool body 12.

In addition, the second bore 32 is configured such that a second longitudinal axis 40 thereof is inclined, angled or slopes from the outer side 26a to the inner side 26b. Thus, the second bore 32 and the second longitudinal axis 40 slope toward the bottom surface 34 of the second end portion 18. In one aspect, the second longitudinal axis 40 is configured to be non-parallel to the horizontal axis 15. In another aspect, the second longitudinal axis 40 is configured to be contained in a plane that is non-parallel to a plane that contains the horizontal axis 15. In another aspect, the second longitudinal axis 40 is inclined at an angle Y in the range of about 5 degrees to about 10 degrees relative to the horizontal axis 15 of the tool body 12. In one example, angle Y is 7 degrees. In another aspect, the plane that contains the second longitudinal axis 40 is inclined at the angle Y in the range of about 5 degrees to about 10 degrees relative to the plane that contains the horizontal axis 15 of the tool body 12.

In another aspect, the first and second bores 30, 32 are offset from the central longitudinal axis 14 of the tool body 12.

In another aspect of the invention, the outer sides 24a, 26a are configured to be generally parallel to the central longitudinal axis 14 and thus generally perpendicular to the horizontal axis 15. In one aspect, the first longitudinal axis 38 and the second longitudinal axis 40 are each inclined at an angle A and B, respectively, in the range of about 80 degrees to about 85 degrees relative to the outer sides 24a and 26a, respectively, of the first and second extending sides 24 and 26 (see FIG. 2).

Figure 3:
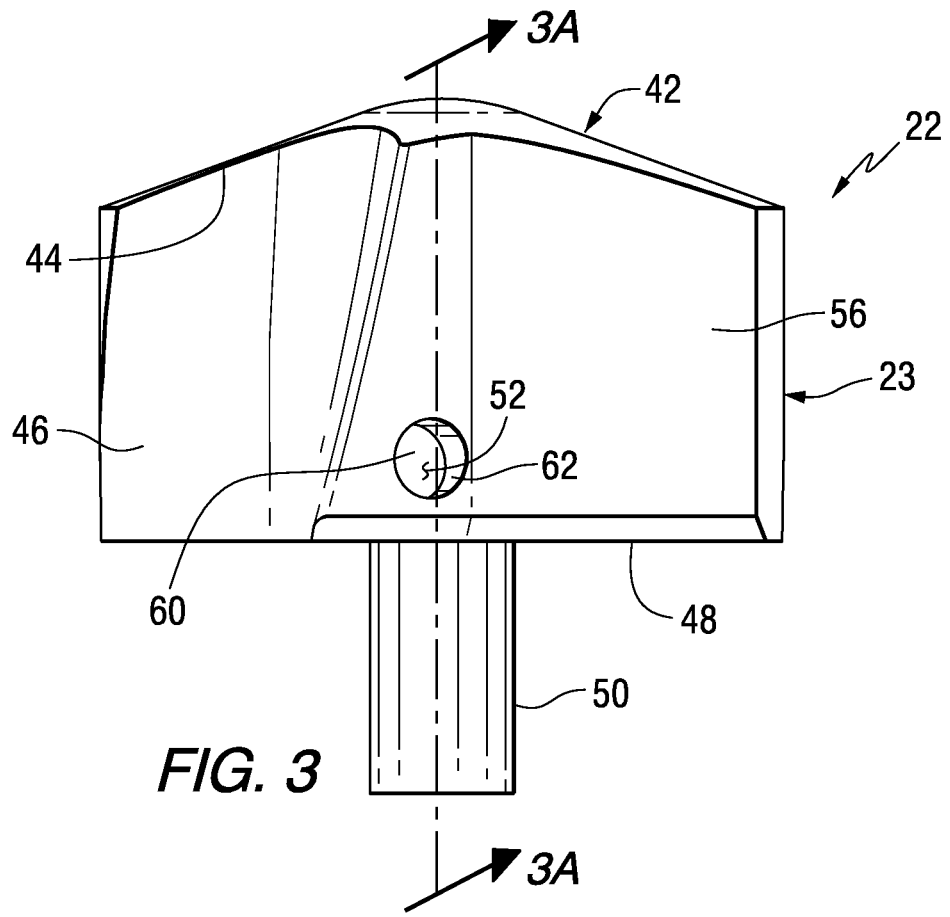
FIG. 3 is a side view of a cutting insert, in accordance with an aspect of the invention.
Figure 3A:
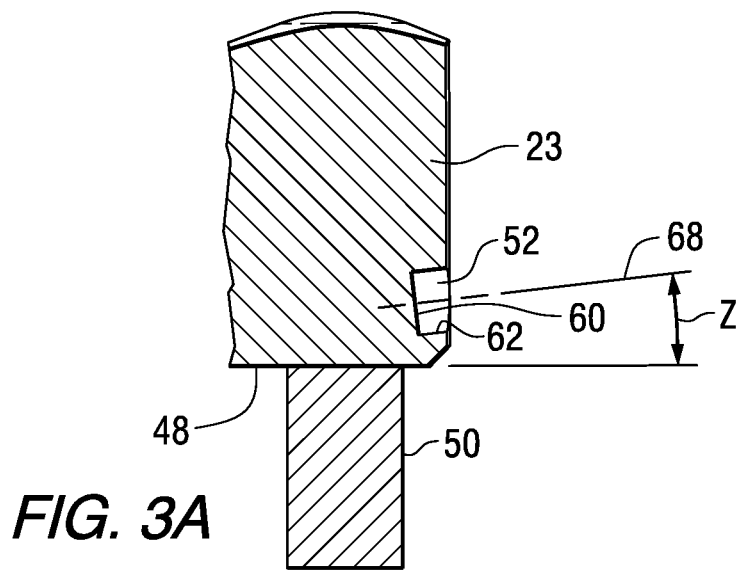
FIG. 3a is a sectional view taken along line 3A-3A of FIG. 3, in accordance with an aspect of the invention.

Referring to FIGS. 3 and 3A, the cutting insert 22 includes a cutting insert body 23 having a cutting portion 42 structured to perform cutting operations on a workpiece (not shown). The cutting portion 42 includes one or more cutting edges 44 and one or more flutes 46 for cooperating with flutes 20 formed in the tool body 12. The cutting insert 22 also includes a bottom surface 48 disposed generally opposite the cutting portion 42 for engaging the mounting surface 34 formed on the second end portion 18 of the tool body 12. In one aspect, the bottom surface 48 is generally planar. In another aspect, the cutting insert includes a mounting post 50 extending from the bottom surface 48 of the cutting insert 22 for receipt in the mounting hole 36.

The cutting insert 22 also includes a first aperture 52 and a second aperture 54 formed in opposing sides 56 and 58, respectively, of the cutting insert 22. The first aperture 52 includes an end surface 60 and a continuous circumferential wall 62 extending from the end surface 60 so as to form a pocket. The second aperture 54 includes an end surface 64 and a continuous circumferential wall 66 extending from the end surface 64 so as to form a pocket. In addition, the first aperture 52 includes a first longitudinal axis 68 and the second aperture includes a second longitudinal axis 70. Once the cutting tool 10 is assembled, the first longitudinal axis 68 and second longitudinal axis 70 are axially aligned with the first longitudinal axis 38 and the second longitudinal axis 40 of the first and second bores 30, 32, respectively.

Referring to FIG. 3A, the first longitudinal axis 68 of the first aperture 52 is inclined, angled or slopes at an angle Z that is in the range of about 5 degrees to about 10 degrees from the bottom surface 48 of the cutting insert 22. In one example, angle Z is 7 degrees. The second longitudinal axis 70 of the second aperture 54 is similarly inclined, angled or sloped from the bottom surface 48.

Figure 4:
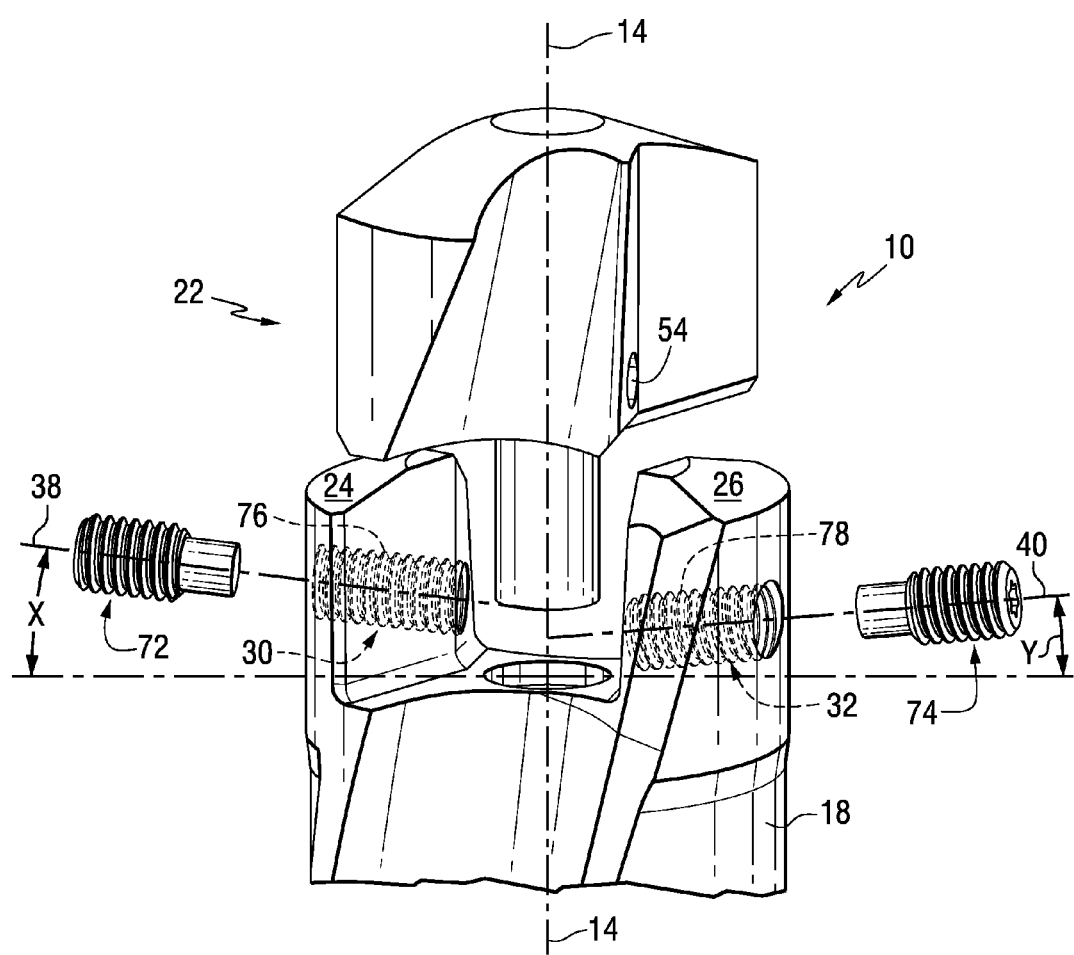
FIG. 4 is an exploded, partial isometric view of an end of the cutting tool illustrated in FIG. 1, in accordance with an aspect of the invention.
Figure 5:
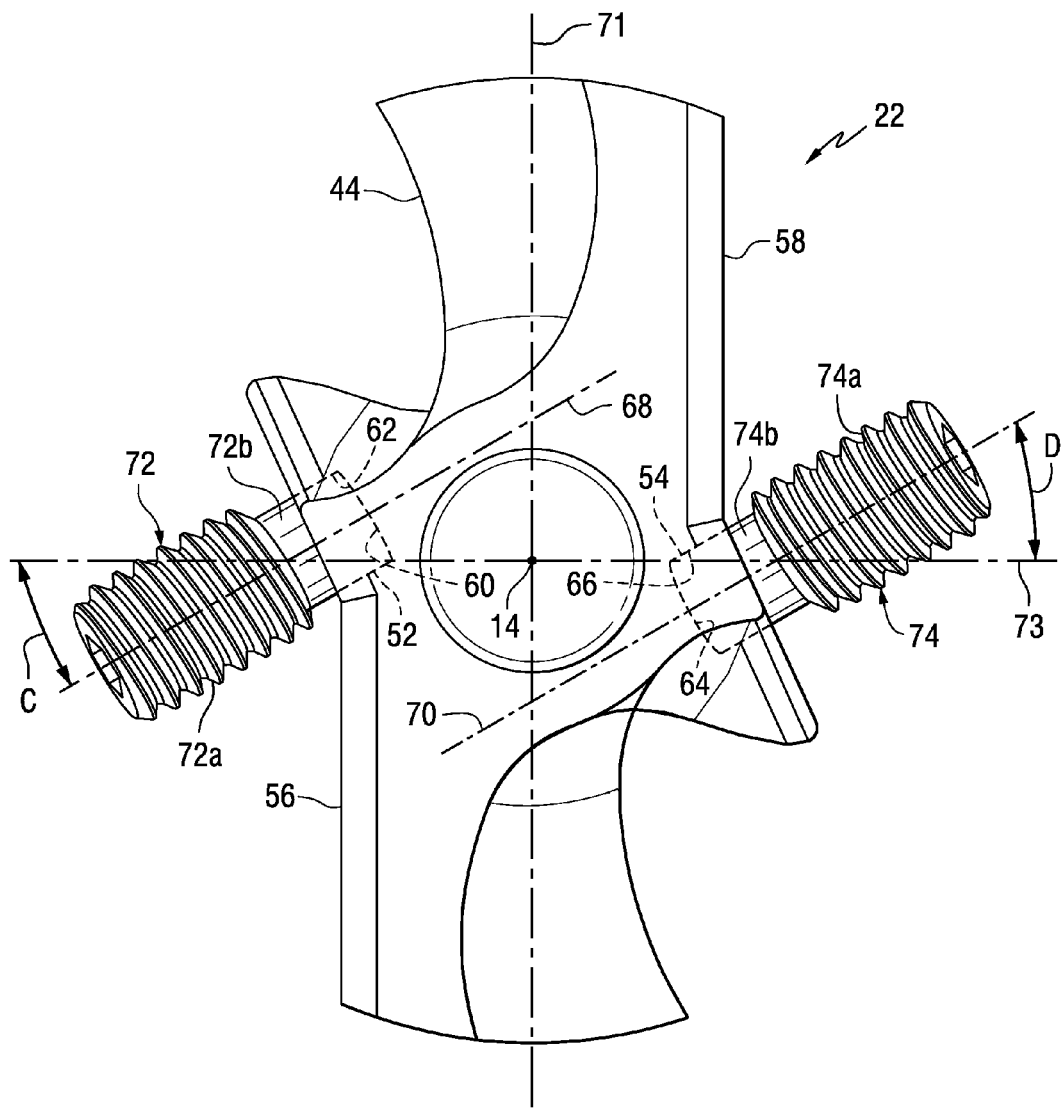
FIG. 5 is a partial top view of the cutting insert with attachment elements, in accordance with an aspect of the invention.

Referring to FIGS. 4-6, cutting insert 22 is configured to be removably attached to the second end portion 18 of the tool body 12. Thus, the cutting insert 22 is removable in order that it can be easily replaced due to, for example, wear or mechanical failure.

In accordance with an aspect of the invention, a first attachment element 72 and second attachment element 74 are provided and configured for receipt in the first and second bores 30, 32, respectively, and adapted to engage the cutting insert 22 and secure the cutting insert 22 to the tool body 12. The first and second attachment elements 72, 74 each include a threaded portion 72a, 74a and a non-threaded portion 72b, 74b, respectively. The threaded portions 72a, 74a are configured for cooperating with threads 76 and 78 formed in the first and second bores 30, 32, respectively. In one aspect, the threaded portion 72a, 74a has a larger diameter D1 than a diameter D2 of the non-threaded portion 72b, 74b.

As shown in FIG. 5, the cutting insert 22 includes a major axis 71 and a minor axis 73 perpendicular thereto. In one aspect, the first longitudinal axis 68 and the second longitudinal axis 70 of the first and second apertures 52 and 54, respectively, are configured relative to the minor axis 73 at angles C and D, respectively, in the range of about 25 degrees to about 35 degrees. In one example, angles C and D are each 30 degrees.

In another aspect of the invention, the non-threaded portion 72b, 74b of the first and second attachment elements 72, 74 is configured for receipt in respective first and second apertures 52, 54 formed in the cutting insert 22.

Accordingly, it will be appreciated that the cutting insert 22 is configured to be removably attached (e.g. replaceable) to the second end portion 18 of the tool body 12 by first inserting the cutting insert 22 in the slot 28 such that the mounting post 50 is inserted in the mounting hole 36. This provided for the first and second bores 30, 32 to be axially aligned with the first and second apertures 52, 54, respectively. The first and second attachment elements 72, 74 are then inserted into the bores 30, 32. The smaller diameter, non-threaded portions 72b, 74b pass through the threads 76, 78 and allow for the threaded portions 72a, 74a to engage threads 76, 78. As the attachment elements 72, 74 continue inwardly, the non-threaded portions 72b, 74b are received in the first and second apertures 52, 54. This prevents the cutting insert 22 from being removed from the slot 28 during operation of the cutting tool 10. Advantageously, the described configuration of the bores 30, 32 being positioned at an inclined angle relative to the central longitudinal axis 14 of the tool body 12 provides for increased retention force being applied to the cutting insert 22 to better secure the cutting insert 22 to the tool body 12.

The non-threaded portions 72b, 74b will be received in the apertures 52, 54 respectively on screwing in. This screwing in action will push cutting insert 22 downwards towards mounting surface 34 formed on the second end portion 18 of the tool body 12. Also, this screwing in action of both first and second attachment elements 72, 74 will cause a coupling action which will push cutting insert 22 towards inner surfaces 24b, 26b of the second end portion 18 of the tool body 12. In this way, the cutting insert 22 will be hold rigidly in the slot 28 therebetween the first extending side 24 and the second extending side 26.

Whereas particular aspects of this invention have been described above for purposes of illustration, it will be evident to those skilled in the art that numerous variations of the details of the present invention may be made without departing from the invention.

The invention claimed is:

1. A cutting tool, comprising:
a generally cylindrical tool body disposed about a central longitudinal axis, the tool body having a first end portion adapted to be coupled to a machine tool and an opposite second end portion having first and second extending sides disposed opposite one another and defining a slot therebetween, the first and second extending sides having respective first and second bores that pass therethrough, wherein a first longitudinal axis of the first bore and a second longitudinal axis of the second bore are configured to be disposed obliquely to a horizontal axis of the tool body that is perpendicular to the central longitudinal axis of the tool body;
a replaceable cutting insert having a cutting portion structured to perform cutting operations on a workpiece, the cutting insert configured to be removably attached to the second end portion of the tool body; and
first and second attachment elements configured for receipt in the first and second bores, respectively, and adapted to engage the cutting insert and secure the cutting insert to the tool body.

2. The cutting tool of claim 1, wherein the first longitudinal axis and the second longitudinal axis are each inclined at an angle in the range of about 5 degrees to about 10 degrees relative to the horizontal axis of the tool body.

3. The cutting tool of claim 1, wherein the cutting insert includes a bottom surface disposed generally opposite the cutting portion for engaging a mounting surface formed on the second end portion of the tool body, the mounting surface extending between the first and second extending sides.

4. The cutting tool of claim 3, wherein the mounting surface includes a mounting hole for receiving a mounting post extending from the bottom surface of the cutting insert.

5. The cutting tool of claim 1, wherein the first and second attachment elements each include a threaded portion and a non-threaded portion, the threaded portion configured for cooperating with threads formed in the first and second bores, respectively.

6. The cutting tool of claim 5, wherein the non-threaded portion of the first and second attachment elements is configured for receipt in respective first and second apertures formed in opposing sides of the cutting insert.

7. The cutting tool of claim 6, wherein the first and second apertures include a first and second longitudinal axis, respectively, that are axially aligned with the first longitudinal axis and the second longitudinal axis of the first and second bores.

8. The cutting tool of claim 7, wherein the first longitudinal axis and the second longitudinal axis of the first and second apertures are each inclined at an angle in the range of about 5 degrees to about 10 degrees from the bottom surface of the cutting insert.

9. The cutting tool of claim 6, wherein the first and second apertures each include an end surface and a continuous circumferential wall extending from the end surface.

10. The cutting tool of claim 1, wherein the first and second bores are radially offset from the central longitudinal axis of the tool body.

11. The cutting tool of claim 5, wherein the threaded portion has a larger diameter than a diameter of the non-threaded portion.

12. The cutting tool of claim 7, wherein the replaceable cutting insert has a major axis and a minor axis perpendicular to the major axis, wherein the first longitudinal axis and the second longitudinal axis of the first and second apertures are configured relative to the minor axis at an angle in the range of about 25 degrees to about 35 degrees.

13. A cutting tool, comprising:
a generally cylindrical tool body disposed about a central longitudinal axis, the tool body having a first end portion adapted to be coupled to a machine tool and an opposite second end portion having first and second extending sides disposed opposite one another and defining a slot therebetween, the first and second extending sides each having an outer side, an inner side and respective first and second bores that pass from the outer sides to the inner sides, the outer sides being parallel to the central longitudinal axis, wherein a first longitudinal axis of the first bore and a second longitudinal axis of the second bore are both inclined from the outer sides to the inner sides;
a replaceable cutting insert having a cutting portion structured to perform cutting operations on a workpiece, the cutting insert configured to be removably attached to the second end portion of the tool body; and
first and second attachment elements configured for receipt in the first and second bores, respectively, and adapted to engage the cutting insert and secure the cutting insert to the tool body.

14. The cutting tool of claim 13, wherein the first longitudinal axis and the second longitudinal axis are each inclined at an angle in the range of about 80 degrees to about 85 degrees relative to the outer sides of the first and second extending sides, respectively.

15. The cutting tool of claim 13, wherein the cutting insert includes a bottom surface disposed generally opposite the cutting portion for engaging a mounting surface formed on the second end portion of the tool body, the mounting surface having a mounting hole for receiving a mounting post extending from the bottom surface of the cutting insert.

16. The cutting tool of claim 13, wherein the first and second attachment elements each include a threaded portion and a non-threaded portion, the threaded portion configured for cooperating with threads formed in the first and second bores, respectively.

17. The cutting tool of claim 16, wherein the non-threaded portion of the first and second attachment elements is configured for receipt in respective first and second apertures formed in opposing sides of the cutting insert.

18. The cutting tool of claim 17, wherein the first and second apertures include a first and second longitudinal axis, respectively, that are axially aligned with the first longitudinal axis and the second longitudinal axis of the first and second bores.

19. The cutting tool of claim 18, wherein the first longitudinal axis and the second longitudinal axis of the first and second apertures are each inclined at an angle in the range of about 5 degrees to about 10 degrees from the bottom surface of the cutting insert.

20. The cutting tool of claim 17, wherein the first and second apertures each include an end surface and a continuous circumferential wall extending from the end surface.

* * * * *